(12) United States Patent
von Mansberg

(10) Patent No.: US 12,022,264 B2
(45) Date of Patent: Jun. 25, 2024

(54) CHARGING DEVICE OF A HEARING AID AND SYSTEM WITH THE CHARGING DEVICE

(71) Applicant: Sivantos Pte. Ltd., Singapore (SG)

(72) Inventor: Thilo von Mansberg, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 83 days.

(21) Appl. No.: 17/736,262

(22) Filed: May 4, 2022

(65) Prior Publication Data

US 2022/0360915 A1 Nov. 10, 2022

(30) Foreign Application Priority Data

May 4, 2021 (DE) ...................... 10 2021 204 485.9

(51) Int. Cl.
*H04R 25/00* (2006.01)
*H04R 1/10* (2006.01)

(52) U.S. Cl.
CPC ......... *H04R 25/556* (2013.01); *H04R 1/1025* (2013.01); *H04R 2225/31* (2013.01)

(58) Field of Classification Search
CPC . H04R 25/556; H04R 1/1025; H04R 2225/31
USPC ....................................................... 381/312
See application file for complete search history.

(56) References Cited

U.S. PATENT DOCUMENTS

| | | | |
|---|---|---|---|
| 8,213,651 B2 | 7/2012 | Schmidt et al. | |
| 10,014,607 B1* | 7/2018 | Govari | H01R 12/78 |
| 2001/0015887 A1* | 8/2001 | Sanada | H05K 7/209 |
| | | | 361/704 |
| 2004/0114773 A1* | 6/2004 | Jensen | H01R 13/2414 |
| | | | 381/91 |
| 2008/0298629 A1* | 12/2008 | Huang | H04R 9/06 |
| | | | 381/398 |
| 2009/0067652 A1* | 3/2009 | Schmidt | H04R 25/556 |
| | | | 381/314 |
| 2014/0363987 A1 | 12/2014 | Hodge et al. | |
| 2017/0093087 A1 | 3/2017 | Esmaeili et al. | |
| 2018/0175643 A1 | 6/2018 | Shim et al. | |

FOREIGN PATENT DOCUMENTS

| | | |
|---|---|---|
| DE | 29718104 U1 | 12/1998 |
| DE | 102007042324 A1 | 3/2009 |

* cited by examiner

*Primary Examiner* — Katherine A Faley
(74) *Attorney, Agent, or Firm* — Laurence A. Greenberg; Werner H. Stemer; Ralph E. Locher

(57) ABSTRACT

A charging device of a hearing aid has a charging unit, which has a housing with a housing cover and a magnet arranged therein and movably guided in a longitudinal direction. At one longitudinal end, a contact is attached on the magnet for the detachable, direct electrical contacting with a counter contact of the hearing aid. The contact is electrically connected by a line to a charging circuit, wherein the housing cover has an opening, within which the contact is inserted. The charging device is part of a system having a hearing aid.

19 Claims, 11 Drawing Sheets

CHARGING DEVICE OF A HEARING AID AND SYSTEM WITH THE CHARGING DEVICE

CROSS-REFERENCE TO RELATED APPLICATION

This application claims the priority, under 35 U.S.C. § 119, of German Patent Application DE 10 2021 204 485.9, filed May 4, 2021; the prior application is herewith incorporated by reference in its entirety.

FIELD AND BACKGROUND OF THE INVENTION

The invention relates to a charging device of a hearing aid. The charging device has a contact for detachable, direct electrical contacting with a counter contact of the hearing aid. Furthermore, the invention relates to a system having a charging device and a hearing aid.

Persons who suffer from a loss of the sense of hearing typically use a hearing aid device. Ambient sound is typically acquired by means of an electromechanical sound transducer. The electrical signals generated on the basis of the ambient sound are processed by an amplifier circuit and introduced by a further electromechanical transducer in the form of a receiver into the auditory canal of the person. Moreover, processing of the acquired sound signals usually takes place, for which purpose a signal processor of the amplifier circuit is typically used. The amplification is adapted here to a possible hearing loss of the hearing aid device wearer.

Electrical energy is required for the operation of the transducer and of the amplifier circuit. This is typically provided in the form of a battery, which is arranged in a housing of the hearing aid. A freedom of movement is thus enabled for the person using the hearing aid device, thus the hearing aid device wearer. When the battery is empty, it is necessary to replace it. For this purpose, the housing typically has a flap through which the battery is accessible.

It is disadvantageous here that foreign particles or moisture can penetrate into the housing due to leaks and can damage the components of the hearing aid device arranged there, such as the amplifier circuit. As a result, a comparatively extensive seal is required. Due to the comparatively small space available, moreover, design costs and production costs are increased. Due to the comparatively small dimensions of the flap, further aids are usually required for the operation, and incorrect operation by the person is not excluded.

One alternative therefore provides using a rechargeable battery. If the battery is empty, to provide the further functionality, it is therefore solely necessary to charge it again, without a removal being required. As a result, it is possible to make the housing essentially sealed, and operation is simplified. A charging device is typically used for charging. In one embodiment, the charging of the battery is carried out inductively. However, it is necessary for this purpose that the hearing aid device is positioned in a specific position with respect to the charging device so that an efficient transfer of the electrical energy can take place. An additional circuit inside the hearing aid device is also required for this purpose, so that the size of the housing is increased.

In an alternative thereto, the charging device has contacts, which are electrically contacted directly with corresponding counter contacts of the hearing aid device. For example, for this purpose the contact and the counter contact are plugged one into the other. Due to the comparatively small dimensions, however, this can only be carried out in a comparatively difficult manner. In an alternative thereto, the counter contact is usually configured as a flat metal plate, and the contact of the charging device is shaped in the manner of a Pogo pin. The electrical contact is created by means of laying the counter contact on the contact. A tolerance compensation takes place here due to the Pogo pin, so that even if the counter contact is not laid exactly on the contact, an electrical transfer of electrical energy is enabled. Handling is thus simplified.

The Pogo pins typically have a contact region which is spring-loaded. When the counter contact is laid on the contact, the spring is at least partially compressed and tensioned, so that both contacts abut one another in a friction-locked manner. However, production is made more difficult due to the comparatively small dimensions. In this case, the contact region of the Pogo pin, when it is not electrically contacted with the counter contact, also protrudes comparatively far from a housing of the charging device due to the active spring force. Therefore, in the event of unskilled handling of the charging device, it is not excluded that further objects can be moved against the Pogo pin, which is not arranged flush, which can result in damage thereto.

SUMMARY OF THE INVENTION

The invention is based on the object of specifying a particularly suitable charging device of a hearing aid and a particularly suitable system having a charging device and a hearing aid, wherein in particular a susceptibility to repair and/or production costs are reduced.

This object is achieved according to the invention with respect to the charging device by the features of the independent charging device claim and with respect to the system by the features of the independent system claim. Advantageous refinements and embodiments are the subject matter of the dependent claims.

The charging device is used to charge a hearing aid, thus to supply the hearing aid with electrical energy. The charging device is suitable, in particular provided and configured, for this purpose. In particular, it is possible to connect the hearing aid detachably to the charging device or at least to electrically contact it therewith. Electrical energy is transferred to the hearing aid during operation by means of the charging device, in particular to an energy storage device of the hearing aid. In summary, a charging device of a hearing aid is understood in particular as a charging device for a hearing aid, wherein the charging device is not a component of the hearing aid.

The hearing aid expediently has a counter contact for this purpose, which is introduced, for example, into a hearing aid housing. The counter contact is manufactured from an electrically conductive material, in particular a metal. For example, the counter contact is manufactured from a ferromagnetic material and is magnetized, for example. The counter contact is expediently electrically contacted with the energy storage device. After the hearing aid, in particular the energy storage device, has been at least partially charged, it is preferably possible to remove the hearing aid from the charging device, so that the hearing aid can be used independently of the charging device.

The charging device has a charging unit, which contains a housing. A magnet, which is movably guided in a longitudinal direction, is arranged inside the housing. In particular, it is possible to displace the magnet in the longitudinal direction inside the housing. It is expediently solely possible to move the magnet in the longitudinal direction, so that it is only displaceable in one dimension. The guiding of the magnet is preferably carried out by the housing itself, suitably by means of possible inner walls of the housing or at least parts of inner walls of the housing. A clearance fit is preferably implemented for this purpose between the housing and the magnet. The housing furthermore has a housing cover, which delimits the housing on one side, in particular in the longitudinal direction. For example, the housing cover is fastened on further components of the housing or molded thereon, so that the housing is integral overall. For example, the housing cover is fastened on a pot-shaped remainder of the housing. In particular, the housing cover at least partially forms an end face of the housing and for this purpose is in particular arranged essentially perpendicular to the longitudinal direction.

The magnet is preferably a permanent magnet. The magnet is produced, for example, from a ferrite or from rare earth elements or comprises at least one of these. The magnet is suitably made at least partially cylindrical, and the housing is made hollow cylindrical at least in sections, wherein the magnet is enclosed on the circumference by the housing. The cylinder axis of the magnet is preferably parallel to the longitudinal direction in this case.

A contact is attached at one longitudinal end of the magnet and, for example, fastened thereon or at least supported thereon. The contact is produced from an electrically conductive material, for example a brass, copper, magnetic steel, or another metal. The contact is used for the direct electrical contacting with the counter contact of the hearing aid and is suitable, in particular provided and configured, for this purpose. It is thus possible to electrically contact the counter contact of the hearing aid with the contact, for which purpose these in particular mechanically abut one another. The electrical contacting is interrupted by means of detaching and the hearing aid is thus galvanically separated from the charging device. In other words, the electrical connection between the counter contact and the contact is galvanically separable.

The contact is electrically connected by means of a line to a charging circuit. The charging circuit is also connected to the magnet, for example, or is separate therefrom. The charging circuit contains, for example, at least one electrical and/or electronic component, and by means of this component in particular an electrical voltage applied to the charging device is transformed to charge the hearing aid. For this purpose, the charging circuit has, for example, a transformer or at least one inverter. Alternatively or in combination therewith, the charging circuit comprises a regulator, by means of which the electrical potential applied to the contact can be set. In particular, the regulator is operated accordingly. For example, the charging circuit has a connection to a power grid, which is provided, for example, in the form of a cable. In operation, in particular a conversion from an electrical AC voltage provided in the power grid into an electrical DC voltage is carried out by means of the charging circuit.

The housing cover has an opening, within which the contact is inserted. A clearance fit is preferably implemented between the contact and the opening. Since the magnet is movable in the longitudinal direction, the contact is thus also movable in the longitudinal direction. The contact is expediently completely enclosed by the housing cover and/or flush therewith when the magnet is spaced apart from the housing cover in the longitudinal direction—and, for example, has the maximum possible distance thereto—or is at least moved in this direction. If in contrast the magnet is moved in the direction of the housing cover, the contact suitably extends through the complete housing cover and expediently protrudes over the housing cover.

In other words, in one of the positions of the magnet, the contact is preferably offset inward with respect to the housing cover or the housing. In this case, damage to the contact is avoided, and it is at least partially protected by means of the housing cover. Due to the longitudinal mobility of the magnet and the contact, it is possible here to move the contact away from the housing, so that electrical contacting with the counter contact of the hearing aid is facilitated. In particular due to a magnetic interaction of the counter contact with the magnet, a movement of the magnet takes place here in the longitudinal direction toward the housing cover, so that the contact protrudes beyond the housing cover or is at least moved in the direction of the counter contact. Establishing the electrical contacting is thus simplified. Comparatively filigree components are not required here, and it is possible to make the charging unit comparatively robust. A susceptibility to repair and production costs are thus decreased. It is also possible to arrange the counter contact comparatively deep inside the hearing aid housing, thus to offset it away from its surface into the interior, so that it is protected. Electrical contacting of the contact with the counter contact is nonetheless enabled here.

The contact is preferably made at least partially or completely cylindrical, wherein the axis of the contact is suitably parallel to the longitudinal direction. In this way, assembly in the openings and movement of the contact are simplified. The contact is suitably arranged at least partially inside the housing and protrudes, for example, through the housing wall. The contact is preferably enclosed on the side of the magnet by means of a sealing ring, by means of which a penetration of foreign particles through the opening into the housing is avoided. The sealing ring is produced, for example, from a rubber and expediently abuts the contact circumferentially.

The charging device particularly preferably contains two such contacts, and the hearing aid contains, for example, two corresponding counter contacts. For example, the two contacts are attached here to the same magnet, and the housing cover has two openings, wherein each of the openings is assigned to respectively one of the contacts. As a result, the two contacts are moved by means of the same magnet. Alternatively thereto, the charging device contains two charging units, wherein each of the charging units is assigned to respectively one of the contacts. An electrical voltage is preferably provided during operation by means of the charging circuit, which is applied to the two contacts, so that an electrical potential difference exists between them. In this way, charging of the hearing aid is simplified if it has the two counter contacts, each of which is electrically contacted with one of the contacts.

In one alternative, the contact is fastened on a first printed circuit board. The first printed circuit board is in particular made rigid and is preferably manufactured from a glass fiber-reinforced epoxy resin. The first printed circuit board is fastened on the magnet, in particular by means of adhesive bonding. Alternatively thereto, solely support of the first printed circuit board and the magnet take place, wherein preferably the position of the first printed circuit board with respect to the magnet cannot be changed or can only be changed to a certain extent due to further structural conditions. It is thus possible to provide the first printed circuit board and the contact attached thereon as a module, which is assembled/fastened on the magnet, which simplifies assembly.

The contact is fastened, for example, by means of SMD technology on the first printed circuit board, and the contact is a surface-mountable component. In this way, automated production of the module is possible, which simplifies and accelerates production. The contact is expediently made at least partially cylindrical for this purpose and is suitably arranged perpendicularly to the first printed circuit board. This printed circuit board is preferably arranged perpendicularly to the longitudinal direction, so that the axis of the contact is suitably in parallel to the longitudinal direction.

The line is formed, for example, by means of a cable or particularly preferably by means of a flexible printed circuit board, which is fastened on the first printed circuit board. For example, an SMD technology is also used for this purpose, or the flexible printed circuit board is soldered in another manner on the first printed circuit board. Alternatively thereto, a plug is fastened on the first printed circuit board, into which the flexible printed circuit board is plugged. In a further alternative thereto, the first printed circuit board and the flexible printed circuit board are integral with one another, so that the first printed circuit board is also made flexible. Electrical contacting of the charging circuit with the contact is always ensured due to the flexible printed circuit board, independently of the position of the contact and/or the magnet within the housing.

The charging device particularly preferably contains a second printed circuit board, by means of which the housing is circumferentially enclosed. The second printed circuit board is a component of the charging circuit here and, for example, forms it. For this purpose, the second printed circuit board contains, for example, multiple electrical/electronic components or these components are at least fastened on the second printed circuit board. Alternatively thereto, the charging circuit contains still further components or printed circuit boards, which are spaced apart, for example, from the second printed circuit board. The second printed circuit board is preferably formed in a ring shape, and in particular is stabilized by means of the housing. The second printed circuit board is particularly preferably fastened on the housing cover, so that the second printed circuit board has a comparatively small distance to the first printed circuit board. A length of the flexible printed circuit board and therefore the paths of the electrical contacting are therefore comparatively short. For example, the second printed circuit board is also made flexible and is, for example, integral with the flexible printed circuit board and/or the first printed circuit board. The second printed circuit board is particularly preferably made rigid and is manufactured, for example, from a glass fiber-reinforced epoxy resin. In this way, robustness is increased and manufacturing is simplified. A comparatively compact charging device is thus provided due to the second printed circuit board, and assembly of the individual components is simplified.

In an alternative thereto, the charging circuit is arranged separately from the housing, and the flexible printed circuit board is expediently guided on the circumference of the magnet along the longitudinal direction. Electrical contacting of the contact with the counter contact is thus not obstructed by means of the flexible printed circuit board, and the flexible printed circuit board is preferably arranged at least partially between the magnet and the possible inner wall of the housing and is thus protected by means thereof.

In an alternative thereto, a recess extending in the longitudinal direction extends through the magnet, which is formed in particular like a drilled hole. The line is arranged inside the recess, which is thus protected by means of the magnet. Damage to the line because of friction/movement of the magnet on/with respect to the possible inner wall is also avoided in this way. The line is suitably formed by means of a cable/lead, so that assembly is simplified. The recess is expediently closed on one side by means of the contact. As a result, penetration of foreign particles into the recess is avoided, so that operational reliability is increased. Penetration of moisture is also prevented. Moreover, a relative movement of the line with respect to the contact is avoided, which could result in wear. For example, the contact is only placed on the surface of the magnet. However, the contact particularly preferably at least partially engages in the recess and is therefore arranged partially inside it.

The contact suitably has a step, which protrudes over the recess and/or partially encloses the recess. An insertion of the contact into the recess is delimited by means of the step. Assembly is thus simplified. The contact is also stabilized by means of the recess, because of which robustness is increased. The cross section of the contact in the longitudinal direction is thus suitably at least partially L-shaped or C-shaped.

For example, the housing cover is made rigid and is manufactured, for example, from a plastic, for example, in a plastic injection molding method. In particular, the mobility of the magnet within the housing is such that upon the electrical contacting of the contact with the counter contact, the magnet is spaced apart from the housing cover. A tolerance compensation is therefore provided, and the contact can be moved farther out of the housing cover if needed, for example, if the counter contact of the hearing aid is spaced apart comparatively far from the housing cover when it is to be charged.

However, the housing cover is particularly preferably made flexible and is particularly preferably produced from a rubber. Therefore, when the counter contact is offset comparatively far into the hearing aid housing, the housing cover is at least partially elastically curved in the direction of the counter contact by means of the magnet due to the acting magnetic force, so that electrical contacting of the contact with the counter contact takes place.

For example, the contact is fastened here on the housing cover, so that robustness is increased. Since the housing cover is made flexible, it is thus moved with the contact in the longitudinal direction when the electrical contacting is established with the counter contact. A fluid-tight connection is suitably created here between the contact and the housing cover, for example, by means of an adhesive. Penetration of foreign particles into the charging unit through the opening is thus avoided.

For example, the housing cover is fastened on further components of the housing, which are in particular produced from a plastic. Alternatively thereto, the complete housing is produced from the rubber and thus is flexible. Introducing the magnet into the housing is thus also enabled, namely in that it is flexibly deformed. For this purpose, the housing expediently has a slot, which can be flexibly widened.

The mobility of the magnet in the longitudinal direction is particularly preferably limited, in particular to less than 1 cm, to less than 5 mm, to less than 3 mm, or to less than 2 mm. In this way, jamming of the contact and/or the magnet inside the housing is avoided and functional reliability is thus increased. Such a mobility is also sufficient for establishing the electrical contacting with the counter contact.

The housing suitably has a stop for the magnet, by means of which the movement of the magnet is limited, at least in one direction. In particular, the stop is provided here by means of the housing cover. Alternatively or in combination therewith, the housing has the stop at the ends facing away from the housing cover, which is provided, for example, by means of a plate arranged perpendicular to the longitudinal direction, for example, a further cover. The stop is preferably shaped like a ring, so that the housing is not made pressure-tight, because of which a movement of the magnet inside the housing between the stops is not obstructed.

A bar is particularly preferably attached to the magnet on the side facing away from the contact, thus on the side opposite to the housing cover. The bar is preferably fastened on the magnet and, for example, adhesively bonded thereon. The bar is arranged transversely to the longitudinal direction and protrudes beyond the magnet. The bar thus protrudes laterally beyond the magnet, thus perpendicularly to the longitudinal direction. The bar is guided inside a slot of the housing which extends in the longitudinal direction. Pivoting of the magnet with respect to the housing is thus avoided by means of the bar, which could otherwise result in jamming of the contact and the housing cover. Furthermore, the movement of the magnet inside the housing is limited by means of the bar and the bottom of the slot, so that the possible stop is provided in particular by means of the bar and the slot.

For example, the end of the contact facing away from the magnet, by means of which in particular the direct electrical contacting with the counter contact takes place, and which in this case expediently mechanically directly abuts the counter contact, is flat and, for example, perpendicular to the longitudinal direction. However, the end of the contact facing away from the magnet is particularly preferably curved. The upper side of the contact is thus curved and, for example, shaped convex or concave. The end and preferably the complete contact is expediently rotationally symmetrical with respect to the axis of the contact. The counter contact is suitably designed accordingly and has the respective corresponding curve. Due to the curve, a planar mechanical contact between the contact and the counter contact is enabled even if a hearing aid is not completely aligned with respect to the charging device, for example, due to an incorrect arrangement of the hearing aid or due to manufacturing tolerances, so that a contact resistance is reduced. An energy demand for the charging is thus reduced and heating in the region of the contact is reduced due to the comparatively low electrical resistance.

The charging unit is particularly preferably arranged in such a way that the longitudinal direction is vertical. The longitudinal direction is at least vertical in this case if the charging device is located in the intended state. In this case, the contact is expediently located above the magnet. As a result, the magnet is thus moved vertically downward due to the acting weight force and thus away from the housing wall. In contrast, if the counter contact approaches the charging unit from above, the weight force is at least partially compensated for by means of the magnetic force and the magnet is raised. As a result, the contact is moved in the direction of the counter contact, which simplifies the electrical contacting.

If the counter contact is spaced apart again and thus the magnetic interaction between the magnet and the counter contact is decreased, the magnet and thus the contact is again moved vertically downward. The contact is thus moved into the opening or at least in the direction of the housing. In other words, the contact is thus moved due to the weight force into the secured position again, in which damage to the contact is prevented.

Alternatively or in combination therewith, an additional component is provided, by means of which the magnet is spaced apart from the housing wall or is at least moved in the direction facing away from the housing wall if no magnetic interaction exists with the counter contact. The additional component is, for example, a spring, in particular a metal spring, so that robustness is increased. It is also possible to use the charging device in different positions and alignments.

The charging device particularly preferably has a charging shell, which is produced, for example, from a plastic. The charging shell is lined using an inlay, which is used in particular to stabilize the hearing aid during the charging process. For this purpose, the hearing aid at least partially abuts the inlay in a formfitting manner, for example, which is thus shaped in accordance with the hearing aid. The inlay is particularly preferably made flexible and is suitably manufactured from a rubber. In this way, a tolerance compensation at least partially takes place by means of the inlay, and damage to the hearing aid is avoided upon the insertion of the hearing aid into the inlay. In particular, the charging circuit is fastened on the charging shell and is arranged, for example, between a wall of the charging shell and the inlay and is thus protected by means of them.

The charging unit is suitably fastened on the inlay, so that with corresponding positioning of the hearing aid in the inlay, the counter contact is always mechanically and therefore electrically contacted with the contact. The inlay particularly preferably has a charging opening for this purpose, which is at least partially closed by means of the housing cover. The hearing aid is thus always securely positioned with respect to the contact. The charging unit and/or the inlay particularly preferably has a seal, which is arranged between them, so that penetration of foreign particles between the inlay and the charging unit is avoided. The seal is particularly preferably fastened on the housing cover and, for example, molded thereon. The housing cover is preferably manufactured from a rubber in this case and has the seal in the form of a bead protruding in the longitudinal direction, which is circular, for example, and encloses the contact, preferably at a distance. The seal at least encloses the charging opening and abuts the inlay in a friction-locked manner in the installed state, for example. A leak-tightness is thus further increased.

The inlay is, for example, fastened on the charging shell by material bonding. However, the inlay is particularly preferably fastened detachably on the charging shell and moreover also detachably on the charging unit. It is thus possible to adapt the charging device to different hearing aids by means of replacement of the inlay, wherein the same charging shell and the same charging unit can be used in each case. As a result, it is possible to manufacture the charging device for a number of different hearing aids, wherein only the inlay is adapted in each case. Mass production is thus at least partially enabled, because of which production costs are reduced. Moreover, it is particularly preferably possible to fasten the charging unit in at least two different or multiple positions on the inlay, so that a flexibility is further increased.

The system has a hearing aid. The hearing aid is, for example, a headphone or comprises a headphone. However, the hearing aid is particularly preferably a hearing aid device. The hearing aid device is used to assist a person suffering from a loss of the sense of hearing. In other words, the hearing aid device is a medical device, by means of which, for example, a partial hearing loss is compensated for. The hearing aid device is, for example, a "receiver-in-the-canal" hearing aid device (RIC; ex-receiver hearing aid device); an "in-the-ear" hearing aid device; an "in-the-canal" hearing aid device (ITC), or a "complete-in-canal" hearing aid device (CIC), hearing aid spectacles, a pocket hearing aid device, a bone vibrator hearing aid device, or an implant. The hearing aid device is alternatively a "behind-the-ear" hearing aid device, which is worn behind a pinna.

The hearing aid is provided and configured to be worn on the human body. In other words, the hearing aid preferably comprises a holding device, by means of which fastening on the human body is possible. Alternatively or in combination thereto, the hearing aid is suitably shaped. If the hearing aid is a hearing aid device, the hearing aid is provided and configured to be arranged, for example, behind the ear or inside an auditory canal. In particular, the hearing aid is wireless and is provided and configured to be inserted at least partially into an auditory canal.

The hearing aid preferably has a hearing aid housing. Preferably, essentially all further components of the hearing aid are arranged in the hearing aid housing, at least preferably possible electronics, such as an amplifier circuit. For example, the hearing aid housing is produced integrally or particularly preferably from multiple components. The hearing aid housing is suitably manufactured from a plastic, in particular in a plastic injection molding method. A level of design freedom is thus comparatively high. A weight of the hearing aid housing is also not excessively increased.

A microphone is arranged in the hearing aid housing, for example, thus in particular an electromechanical acoustic transducer. The microphone is used to acquire ambient sound and is suitable, in particular provided and configured, for this purpose. In particular, the microphone is connected electrically and/or for signaling to any possible electronics, in particular the amplifier circuit, or other electrical/electronic components of the hearing aid. The signals acquired by means of the microphone are suitably processed by means of these electronics.

The hearing aid particularly preferably comprises a further electromechanical acoustic transducer, in particular a receiver, by means of which emission of the signals processed by means of the possible amplifier circuit takes place. For example, the receiver is also arranged in the hearing aid housing or a further housing. For example, a signaling connection of the two housings is produced here by means of a line, in particular if the hearing aid is an RIC hearing aid device.

The hearing aid comprises an energy storage device, by means of which an energy supply is provided. The energy storage device is expediently used for energizing the possible electronics/sound transducer. The energy storage device is suitably arranged inside the possible hearing aid housing. The energy storage device is rechargeable and is expediently a rechargeable battery. The hearing aid suitably comprises a counter contact, which is introduced, for example, into the hearing aid housing. The counter contact is thus accessible from outside the hearing aid housing. For example, the hearing aid housing comprises a cover, which can be detachably moved over the counter contact, for example folded. The counter contact is preferably electrically connected to the energy storage device, for example directly or via a charging circuit.

The system furthermore has a charging device, which is used for charging the hearing aid, namely the energy storage device. The charging device is suitable, in particular provided and configured, for this purpose. The charging device and the hearing aid are units/components of the system which are separate from one another and which can be remote from one another. During charging, in contrast, the charging device and the hearing aid are electrically contacted with one another.

The charging device comprises a charging unit which has a housing containing a housing cover and a magnet arranged therein and movably guided in a longitudinal direction. A contact for the detachable, direct electrical contracting with the counter contact of the hearing aid is attached to the magnet at one longitudinal end, which contact is electrically connected by means of a line to a charging circuit. The housing cover has an opening, inside which the contact is inserted. For charging, the contact of the charging device is electrically contacted with the counter contact of the hearing aid, for which purpose these expediently directly mechanically abut one another.

To establish the electrical contacting, due to a magnetic interaction between the counter contact and the magnet, this magnet is suitably moved in the longitudinal direction, so that the contact attached thereon is moved in the opening toward the counter contact until they abut one another. The charging device expediently has the inlay, by means of which the hearing aid is held and/or stabilized when the hearing aid is charged. In the system, the two devices, thus the charging device and the hearing aid, are detached from one another or connected to one another, wherein the hearing aid is expediently inserted in the possible inlay.

The refinements and advantages explained in conjunction with the charging device are also to be transferred accordingly to the system and vice versa.

Other features which are considered as characteristic for the invention are set forth in the appended claims.

Although the invention is illustrated and described herein as embodied in a charging device of a hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts corresponding to one another are provided with the same reference signs in all figures.

Figure 1:
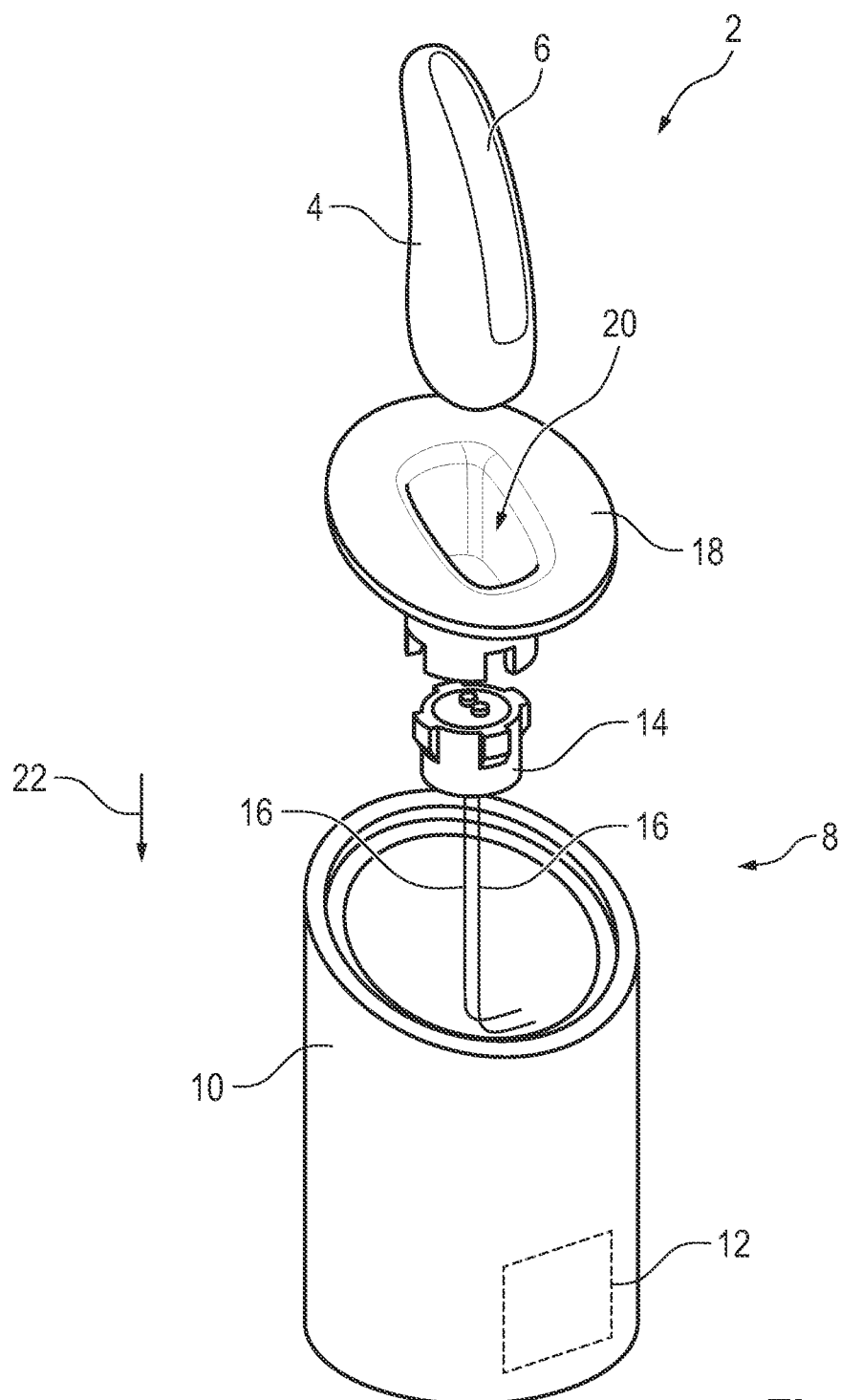
FIG. 1 is a diagrammatic, exploded, perspective view of a hearing aid and a charging device.

Referring now to the figures of the drawings in detail and first, particularly to FIG. 1 thereof, there is shown a system 2 in a perspective and an exploded illustration, which contains a hearing aid 4 in the form of a hearing aid device. The hearing aid device 4 is a "behind-the-ear" (BTE) or "receiver-in-canal" (RIC) hearing aid device and contains a hearing aid housing 6, which is manufactured from a plastic. An energy storage device (not shown in greater detail) in the form of a rechargeable battery is arranged inside the hearing aid housing 6. Moreover, an amplifier circuit energized by the energy storage device and an electromechanical acoustic transducer in the form of a microphone are provided in the hearing aid housing 6.

The system 2 furthermore has a charging device 8, which has a cup-shaped charging shell 10. The charging shell 10 is manufactured from a plastic and is made rigid. A charging circuit 12 (not shown in greater detail) is arranged inside the charging shell 10, which contains a converter and/or transformer and by means of which an electrical DC voltage is provided during operation. For this purpose, the charging circuit 12 contains a cable (not shown in greater detail), which is suitable for electrical connection to a power grid (not shown in greater detail). Moreover, the charging device 8 has a charging unit 14, which contains two lines 16. In the assembled state, the two lines 16 are electrically contacted with the charging circuit 12, so that the charging unit 14 is supplied with electrical energy via the lines 16 by the charging circuit 12.

The charging device 8 has an inlay 18, by means of which the charging shell 10 is partially lined. The inlay 18 is produced from a rubber and the opening of the cup-shaped charging shell 12 is closed by means of it, for which purpose the inlay 18 is arranged there. The inlay 18 has a receptacle 20, which is adapted to the shape of the hearing aid 4, so that the at least one part of the hearing aid 4 can be positioned in a formfitting manner inside the receptacle 20 of the inlay 18 and held securely there. The inlay 18 is detachably fastened on the charging shell 10, and the charging unit 14 is detachably fastened on the inlay 18, wherein the charging unit 14 is located in a longitudinal direction 22, which is vertical, below the inlay 18 and below the receptacle 20. The charging unit 14 is thus enclosed by the inlay 18 and the charging shell 20 and therefore protected. The charging circuit 12 is also arranged there and is protected by means of the charging shell 10 and the inlay 18. In a modification, the inlay 18 is molded from a rigid plastic, so that the fastening of the charging unit 14 is simplified. Alternatively or in combination therewith, more play is formed between the receptacle 20 and the hearing aid 4, so that greatly varying devices can be accommodated by means of the receptacle 20.

Figure 2:
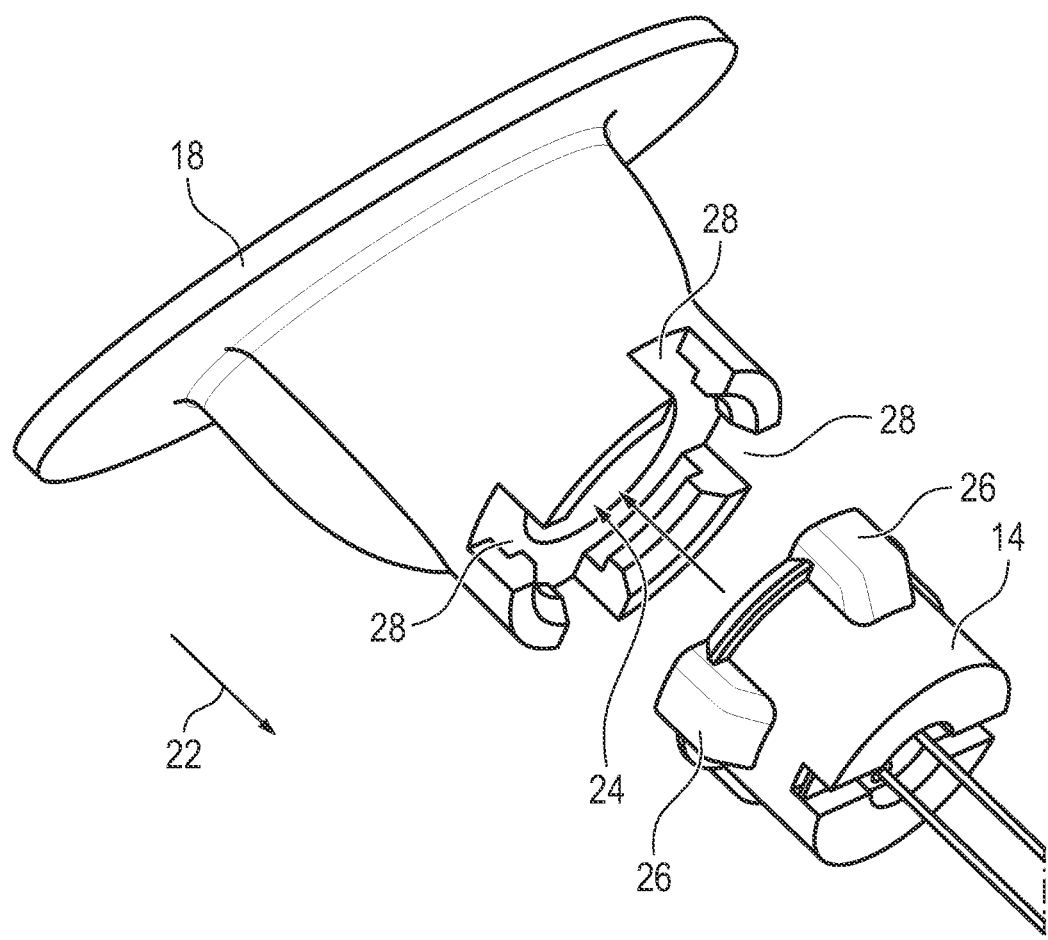
FIG. 2 is a perspective view of an inlay and a charging unit of the charging device.

The inlay 18 and the charging unit 14 are illustrated in perspective in FIG. 2. The inlay 18 has a charging opening 24, which opens into the receptacle 20, and which forms the lower end of the receptacle 20 in the longitudinal direction 22. The charging opening 24 is closed in the assembled state by means of the charging unit 14, which has multiple springs 26, which in the assembled state are each inserted into corresponding grooves 28 of the inlay 18 extending in the longitudinal direction 22. Due to the arrangement of the grooves 28 and the springs 26, it is possible to position the charging unit 14 in different positions with respect to the inlay 18, so that different hearing aids 4 can be used with the charging device 8. It is also possible due to the detachable fastening of the charging unit 14 and the inlay 18 and also the charging shell 10 to replace the inlay 18 with another inlay and thus to adapt to another hearing aid 4, in which the shape of the receptacle 20 is modified accordingly.

Figure 3:
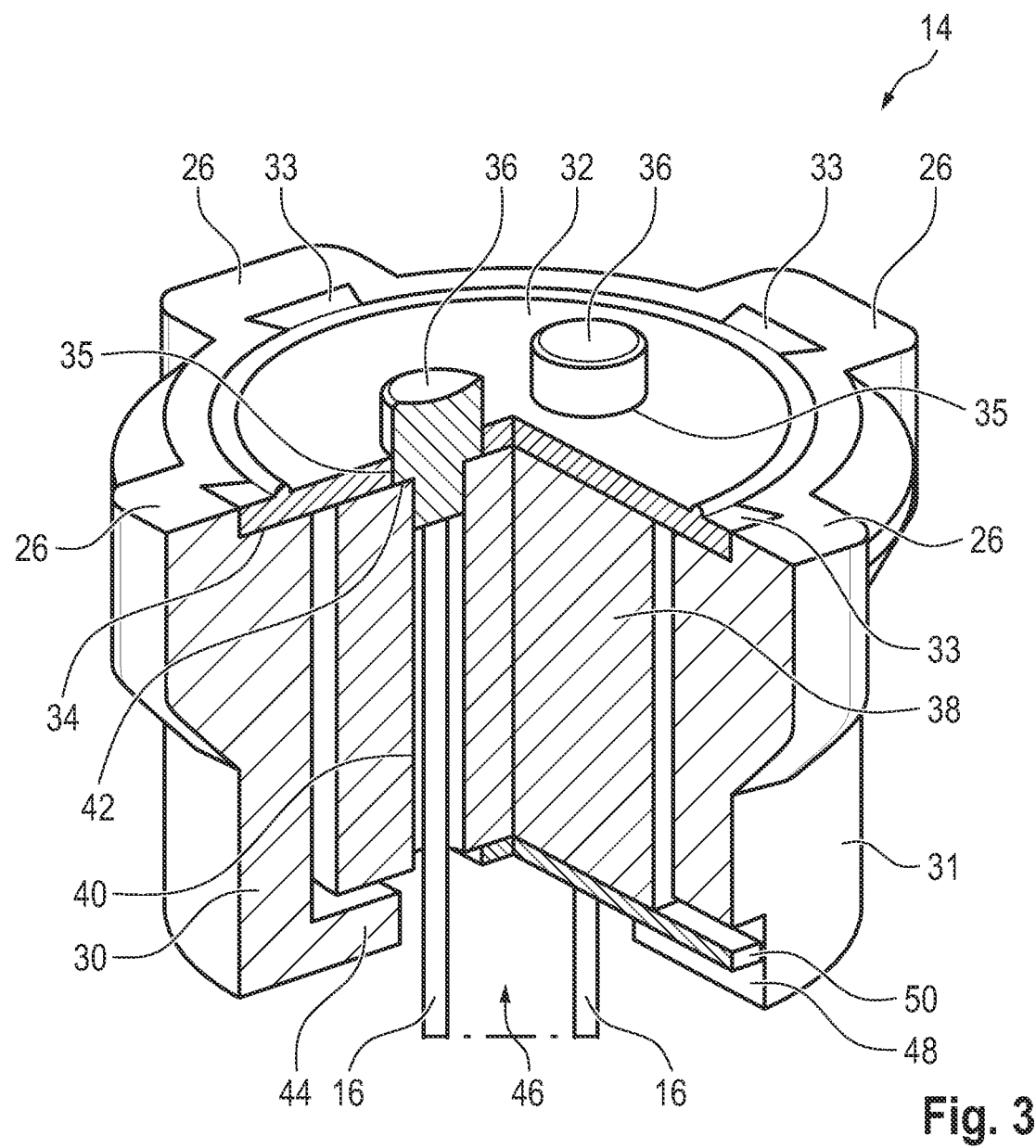
FIG. 3 is a sectional view of the charging unit.
Figure 4:
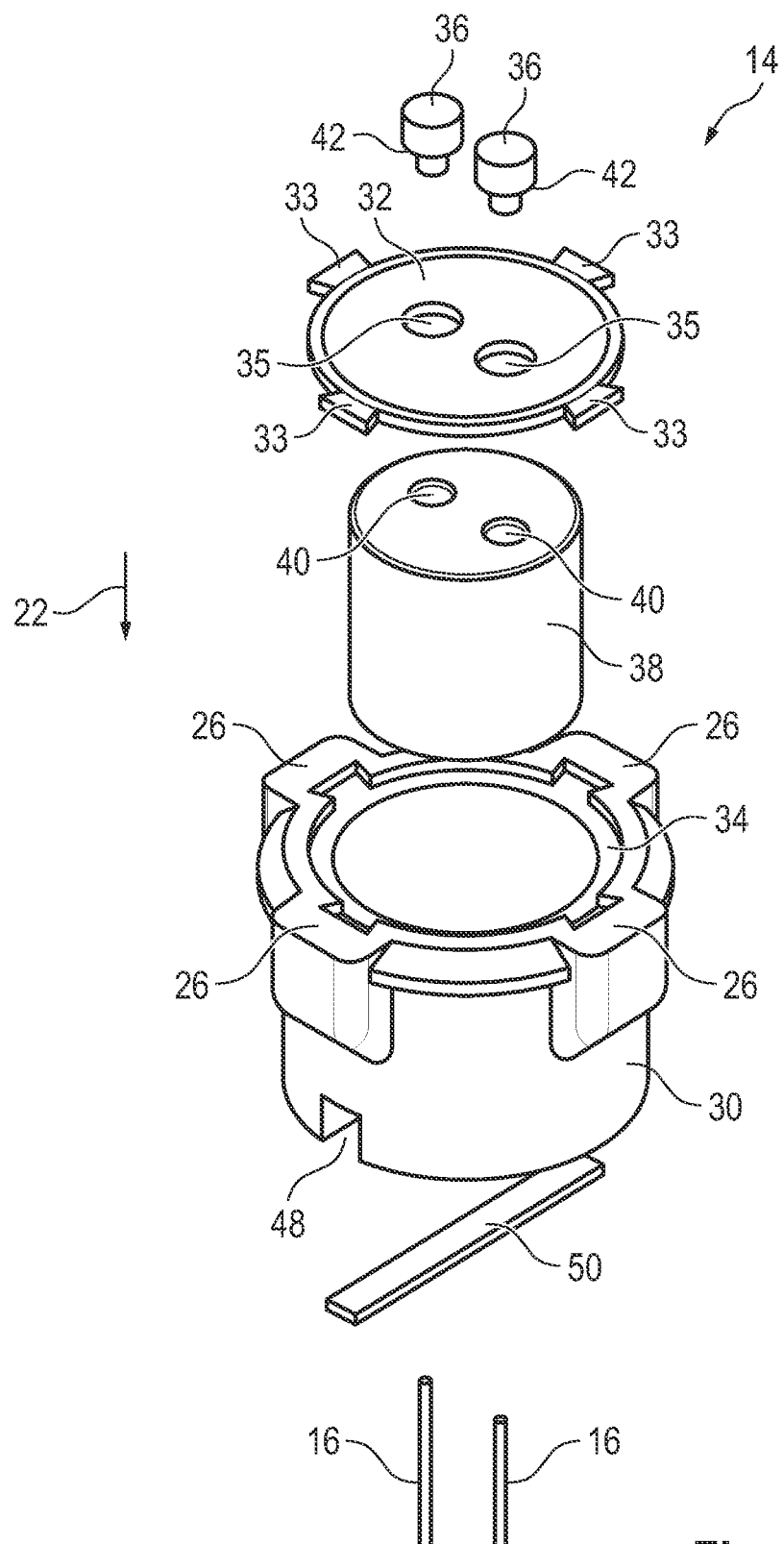
FIG. 4 is an exploded, perspective view of the charging unit.

The charging unit 14 is shown in perspective in FIG. 3 in a sectional illustration and in FIG. 4 in an exploded illustration. The charging unit 14 has a housing 30 having a pot-shaped remainder (housing) 31, the axis of which is parallel to the longitudinal direction 22, thus vertical. In this case, the remainder 31 has the springs 26, which are arranged rotationally symmetrical to one another. The remainder 31 of the housing 30 is manufactured from a plastic and is closed at the upper end in the longitudinal direction 22 by means of a housing cover 32 of the housing 30, which is made flexible and is manufactured from a rubber. The housing cover 32 is fastened on the remainder 31 by means of an adhesive (not shown in greater detail). The housing cover 32 is arranged perpendicularly to the longitudinal direction 20 and is made round and has four extensions 33, which are located in the region of the springs 26 of the remainder 31, and which are at least partially inserted into a correspondingly shaped depression 34 of the remainder 31, which also has a ring-shaped part, within which an edge of the housing cover 32 is inserted.

The housing cover 32 has two openings 35 extending in the longitudinal direction 22, within each of which one contact 36 is inserted. The contacts 36 are cylindrical, wherein their axis is also parallel to the longitudinal direction 22. In one embodiment, the contacts 36 are movable with respect to the housing cover 32, and a clearance fit is produced between each opening 35 and the respective contact 36. In an alternative thereto, a press fit is produced between them, or the contacts 36 are adhesively bonded to the housing cover 32.

A magnet 38 is arranged inside the housing 30, which is made cylindrical and is manufactured from a ferrite. In other words, the magnet 38 is a permanent magnet. The axis of the magnet 38 is parallel to the longitudinal direction 22, and the magnet 38 has two recesses 40 extending in the longitudinal direction 22, which are configured like a drilled hole and extend through the complete magnet 38. One of the lines 16, which are designed as cables or leads, is inserted at the end into each of the recesses 40, and one of the contacts 36 is directly fastened on each of the ends 16 and thus electrically contacted therewith. Each contact 36 is tapered at the lower end in the longitudinal direction 22 by means of a step 42, which protrudes beyond the recess 40. The lower part of each contact 36 is arranged inside the respective recess 40, which is thus closed by means of the respective contact 36. In summary, the two contacts 36, which are electrically connected by means of the respective assigned line 16 to the charging circuit 12, are attached at one longitudinal end 43 of the magnet 38, wherein the housing cover 32 has the two openings 35, within which the contacts 36 are inserted. The charging unit 14 is arranged here in such a way that the longitudinal direction 22 is vertical, wherein the contacts 36 are located above the magnet 38.

The housing 30 is omitted in the center on the side opposite to the housing cover 32, so that this end of the housing 30 is formed by means of a ring-shaped stop 44. The two limp lines 16 are led out of the housing 30 through the further opening 46 formed in this way.

Furthermore, the housing 30, namely the pot-shaped remainder 31, has a slot 48 extending in the longitudinal direction, within which a bar 50 arranged transversely to the longitudinal direction 22 is arranged, which is adhesively bonded to the magnet on the side of the magnet 28 opposite to the longitudinal end 43 in the longitudinal direction 22. It is possible here to move the magnet 38 inside the housing 30, wherein the movement of the magnet 38 is limited by means of the stop 44 and the slot 48. In other words, the magnet 38 is movably guided in the longitudinal direction 22.

Upon a movement of the magnet 38, a movement of the two contacts 36 takes place in the longitudinal direction 22. If the contacts 36 are movable with respect to the housing 32, the contacts 36 are at least partially moved through the opening 35. In contrast, if the contacts 36 are fastened on the housing cover 32, the housing cover 32 is at least partially curved out. If no further forces act, the magnet 38 rests on the stop 44 due to the weight force, and the contacts 36 are moved in the longitudinal direction 22 to the lowermost possible position.

Figure 5:
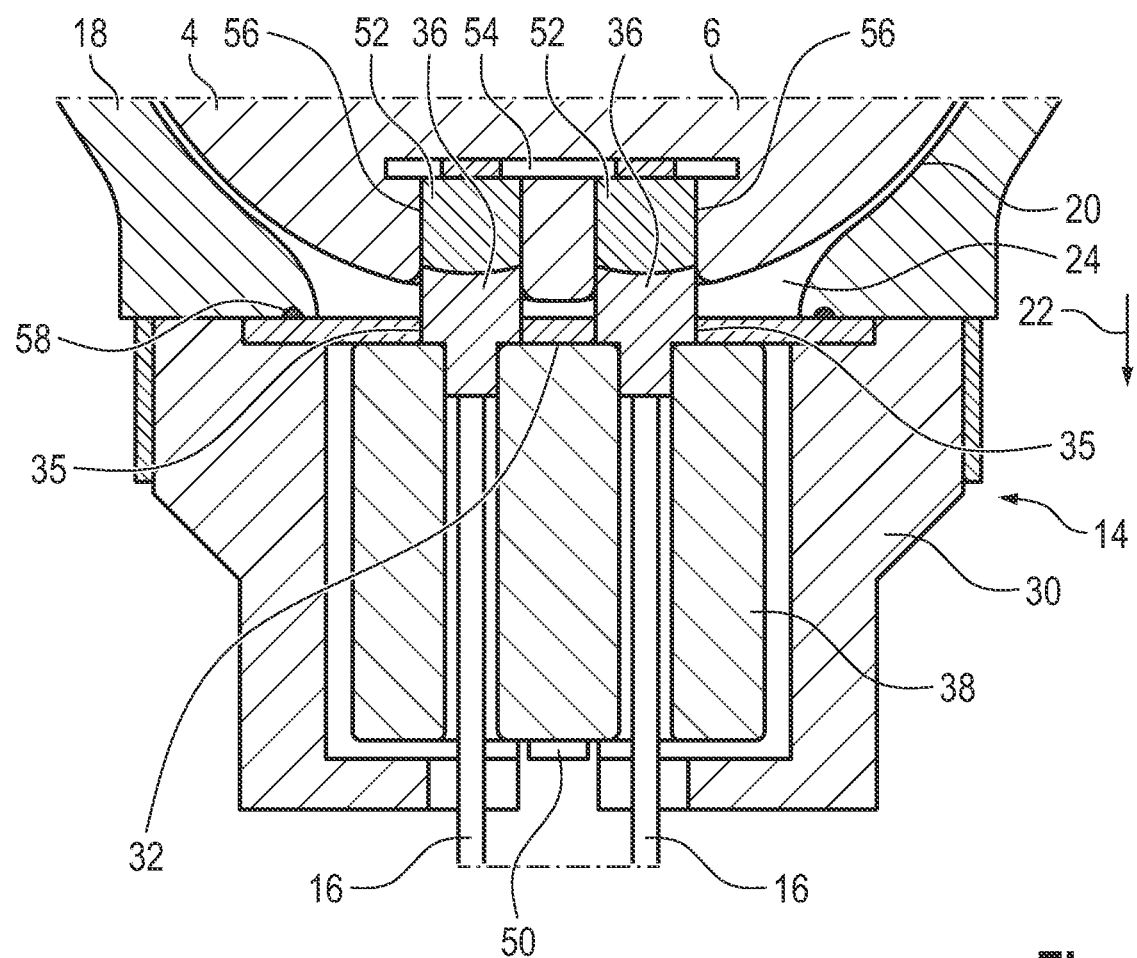
FIG. 5 is a sectional view of the charging unit and the hearing aid electrically contacted therewith.

When the hearing aid 4 is inserted from above into the receptacle 20 in the longitudinal direction 22, two counter contacts 52 introduced into the hearing aid housing 6 approach the charging opening 24, as shown in FIG. 5 in a sectional illustration along the longitudinal direction 22. The counter contacts 52 are produced from a ferromagnetic metal and are electrically connected to the rechargeable battery by means of a further printed circuit board 54, which is arranged inside the hearing aid housing 6. Each counter contact 52 is arranged inside a respective pocket hole 56 and is offset inward with respect to the surface of the hearing aid housing 6. Due to the shape of the receptacle 20, the counter contacts 20, which are also cylindrical, are aligned in such a way that their axis is parallel to the longitudinal direction 22.

With increasing proximity, the interaction of the counter contacts 52 with the magnet 38 strengthens, so that this magnet is moved upward inside the housing 30 in the longitudinal direction 22. As a result, the contacts 36 are also moved upward toward the hearing aid 4 in the longitudinal direction 22. If the contacts 36 are not fastened on the housing cover 32, the contacts 36 are moved through the housing cover 32. If the contacts 36 are fastened on the housing cover 32, the housing cover 32 is curved out in the direction of the hearing aid 4. Due to the bar 50, excessive movement of the magnet 38 and thus the contacts 36 toward the hearing aid 4 is avoided in each case. When the hearing aid 4 has approached the charging unit 14 sufficiently, the contacts 36 partially plunge at the ends into the pocket holes 56. For this purpose, the position of the pocket holes 56 is adapted to the position of the openings 35. When the hearing aid 4 is securely inserted in the receptacle 20, the contacts 36 directly mechanically abut the respective associated counter contact 52 and are thus electrically contacted therewith. Due to the direct mechanical contact between the contacts 36 and the respective assigned counter contact 52, electrical contacting takes place between them, so that the contacts 36 are used for the detachable, direct electrical contacting with the counter contacts 52 of the hearing aid 4. The ends of the contacts 36 facing away from the magnet 38 are made curved, thus the ends facing toward the counter contact 52. These ends are shaped convex here. The ends of the counter contacts 52 facing toward the contacts 36, in contrast, are concavely curved, wherein the type of the curve corresponds, because of which a direct planar contact takes place between them. Due to the curve, a planar contact between the contacts 36 and the counter contacts 52 is enabled even with a non-exact alignment of the hearing aid 4 with respect to the charging unit 14.

In operation, an electrical voltage is applied to the contacts 36 via the lines 16 by means of the charging circuit 12, so that an electrical current is guided via the contacts 36 and the counter contacts 52, by means of which the rechargeable battery of the hearing aid 4 is charged. When the charging is ended, the hearing aid 4 is moved upward in the longitudinal direction 22 out of the receptacle 20, and the magnetic interaction between the counter contacts 52 and the magnet 38 decreases. As a result, the magnet 38 is moved downward again in the longitudinal direction 20 due to the still acting weight force, and therefore the contacts 36 are also, so that they are at least partially enclosed by means of the housing 30, because of which damage is avoided. It is also not necessary here for the counter contacts 52 to protrude beyond the hearing aid housing 6, because of which damage thereto is also avoided.

The charging opening 24 is closed by means of the housing cover 32, which protrudes laterally, thus perpendicularly to the longitudinal direction 22 with respect to the charging opening 34. On the side facing toward the inlay 18, a seal 58 or a part thereof is molded on the housing cover 32. The seal 58 is a ring-shaped bead, which is arranged around the charging opening 24, so that entry of foreign particles between the housing 30 and the inlay 18 is avoided.

Figure 6:
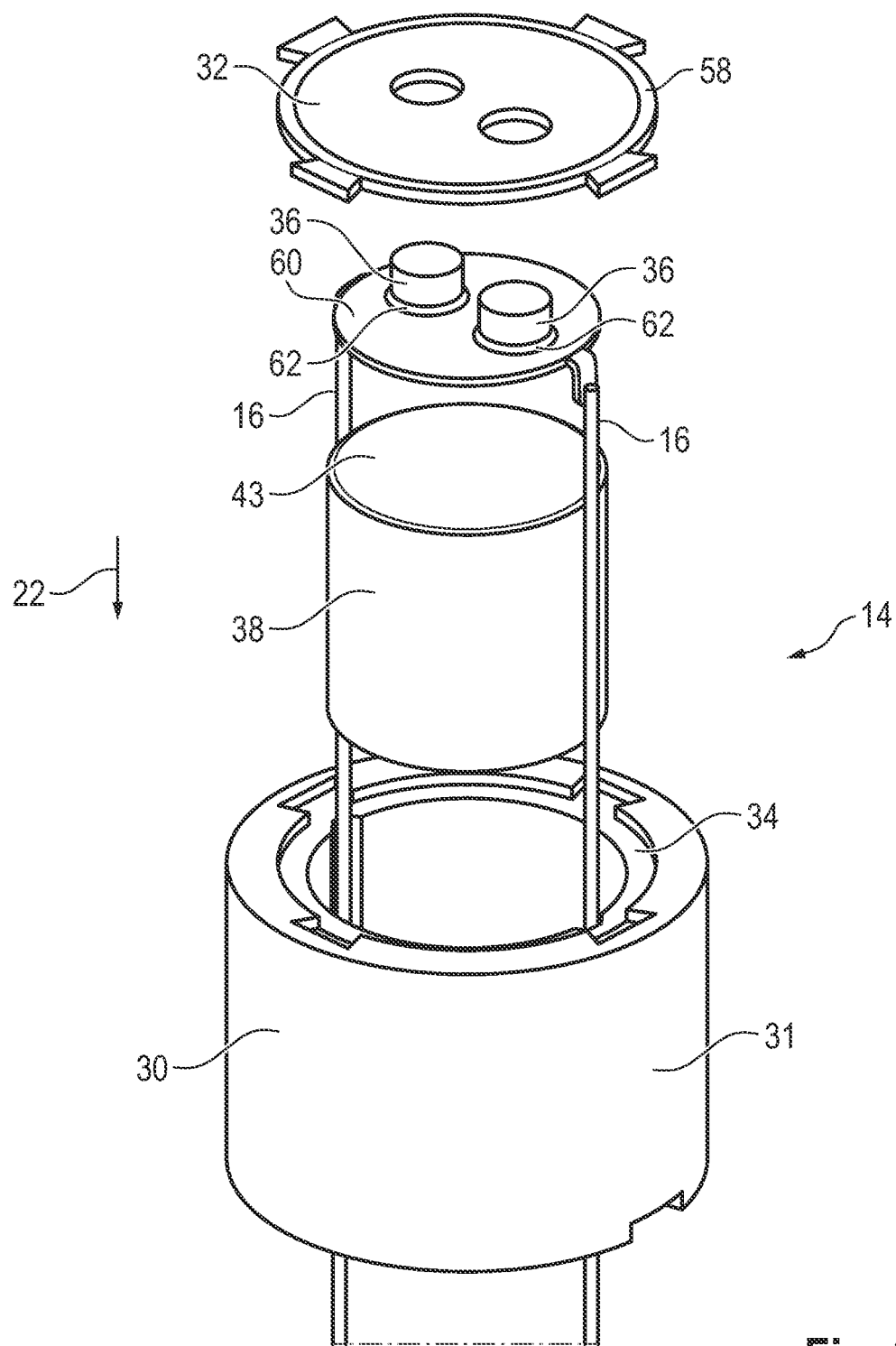
FIG. 6 is an exploded, perspective view of a further embodiment of the charging unit.

FIG. 6 shows a modification of the charging unit 14 in an exploded illustration in perspective. The housing cover 32, in contrast, is not changed. The remainder 31 of the housing 30 now no longer has the springs 26, for example, but it is also possible that these are still provided. However, the magnet 38 is now intact and therefore no longer has the recesses 40, because of which manufacturing thereof is facilitated. The two contacts 36 are fastened by means of SMD technology on a round first printed circuit board 60 arranged perpendicular to the longitudinal direction 22. The first printed circuit board 60 is manufactured from a glass fiber-reinforced epoxy resin and is fastened on the longitudinal end 43 of the magnet 38.

Each line 16 is formed by means of a respective flexible printed circuit board, which are each fastened at the end on the first printed circuit board 60. The two flexible printed circuit boards, thus the two lines 16, are guided on the circumference of the magnet 38 along the longitudinal direction 22 and thus extend in the longitudinal direction between the magnet 38 and the remainder of the housing 31. These lines also in turn exit from the housing 30 through the further opening 46 and are electrically connected to the charging circuit 12, which is not changed.

Figure 7:
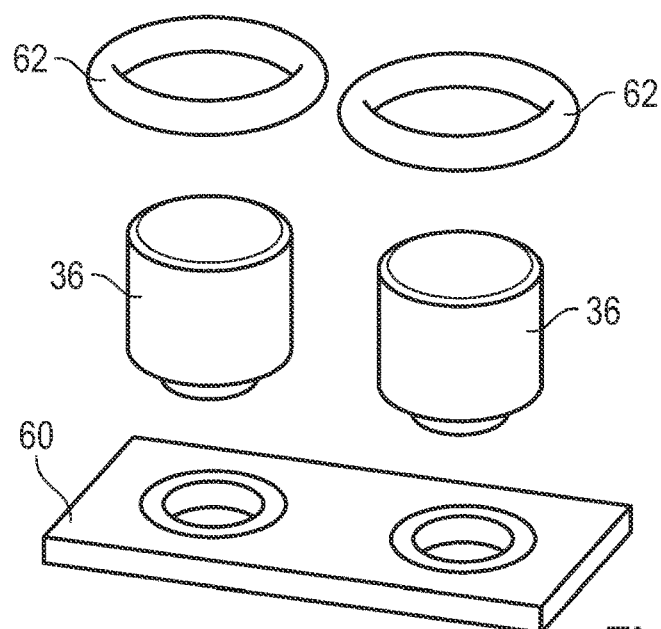
FIG. 7 is an exploded, perspective view of a first printed circuit board and two contacts of the charging unit.

A modification of the first printed circuit board 16 is shown in FIG. 7, which is now made rectangular. Two seal rings 62 are also removed, which are manufactured from a rubber and are each assigned to one of the contacts 36. In the assembled state, the seal rings 62, as in the preceding embodiment, rest on the first printed circuit board 60 and are stabilized there in this way. It is ensured by means of the seal ring 62 that an entry of foreign particles through the opening 35 into the housing 30 does not occur. In one refinement, the printed circuit board 16 is a component of the hearing aid 4, and the contacts 36 shown form the counter contacts 52. In a further modification, the seal rings 62 are not provided. The sealing effect is implemented here by means of the cover 32, which is manufactured from an elastic material. The cover 32 of the charging unit 14 is thus guide, mount, and seal in one.

Figure 8:
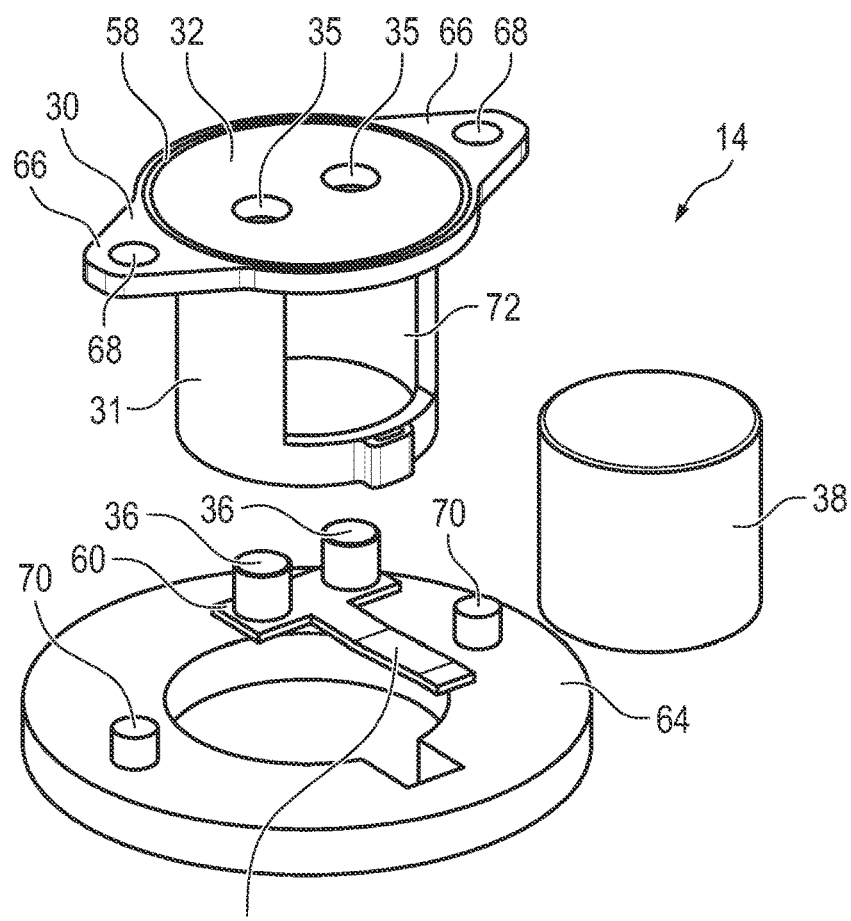
FIG. 8 is an exploded, perspective view of a further embodiment of the charging unit.
Figure 9:
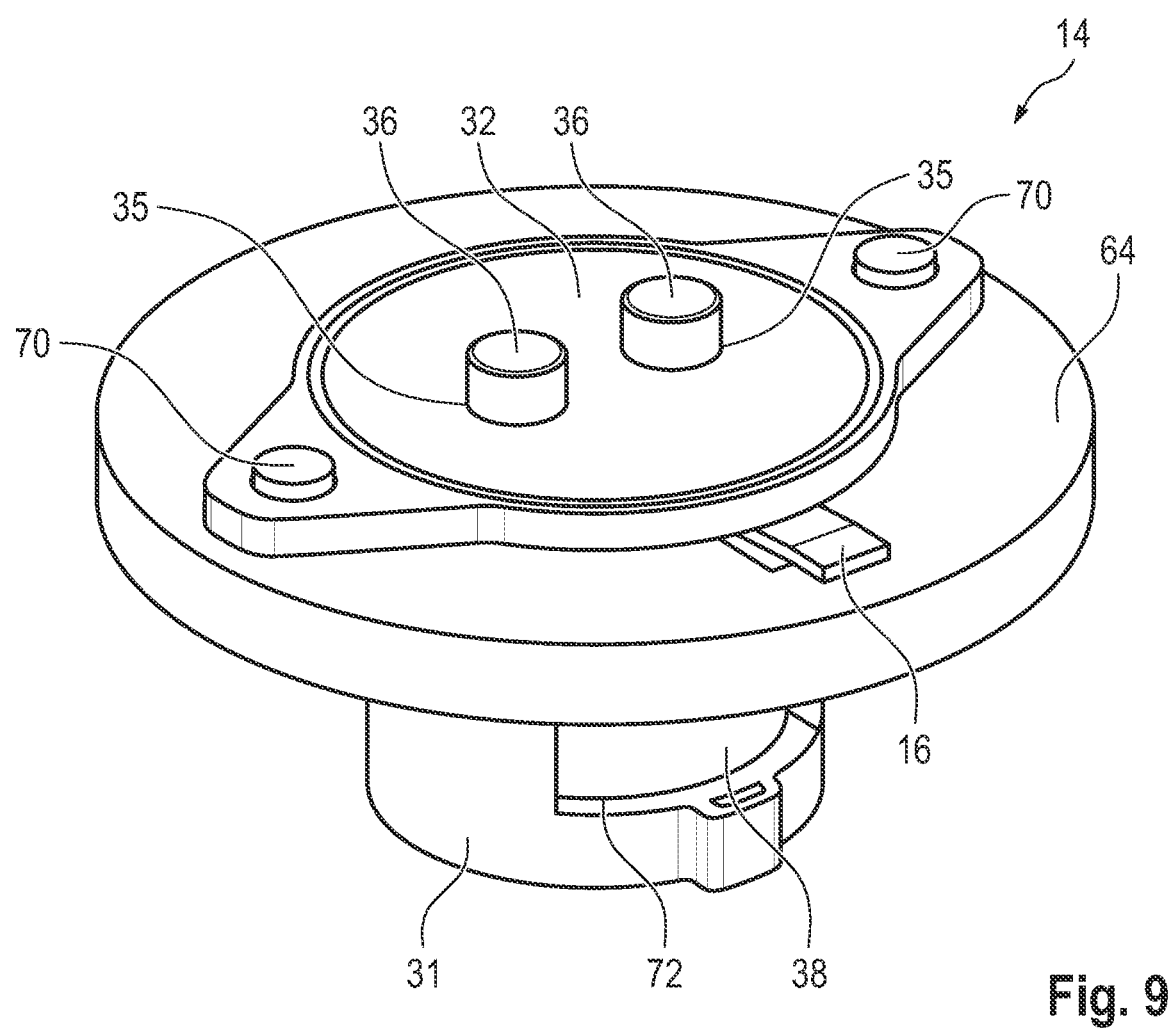
FIG. 9 is a perspective view of the further embodiment of the charging unit in an assembled state.

A further embodiment of the charging unit 14 is shown in an exploded illustration in FIG. 8 and in an assembled state in FIG. 9. The housing 30 is integrally manufactured from a flexible rubber, so that the housing cover 32 and the remainder 31 are molded on. The housing cover 32 again has the two openings 35, within which the two contacts 36 are inserted in the assembled state. These contacts are in turn fastened on the first printed circuit board 60, which is designed as a flexible printed circuit board and is integral with the flexible printed circuit board providing the lines 16. In other words, the two lines 16 are formed by means of the common flexible printed circuit board.

In the assembled state, the flexible printed circuit board and thus the lines 16 are fastened on and electrically contacted with a second printed circuit board 64, which is a component of the charging circuit 12 and contains electrical and/or electronic components (not shown in greater detail). The second printed circuit board 64 is arranged perpendicularly to the longitudinal direction 22 and is made ring-shaped. The second printed circuit board 64 circumferentially encloses the remainder 31 of the housing and abuts two opposing tabs 66 of the housing cover 32, which protrude laterally beyond the seal 58. A retention opening 68 is introduced into each tab 66, in which corresponding pins 70 of the second printed circuit board 64 engage, so that the housing 30 is stabilized with respect to the second printed circuit board 64. In summary, the housing 30, at least the remainder 31, is circumferentially enclosed by the second printed circuit board 64 of the charging circuit 12, and the second printed circuit board 64 is fastened on the housing cover 32, namely the tabs 66.

The magnet 38 is not changed in comparison to the preceding embodiment and is introduced into the housing 30 through an assembly opening 72, which is introduced into a circumferential side of the remainder 31. The assembly opening 72 is elastically widened for this purpose. The slot 48 and the bar 50 of the preceding embodiments are not provided, in contrast.

Figure 10:
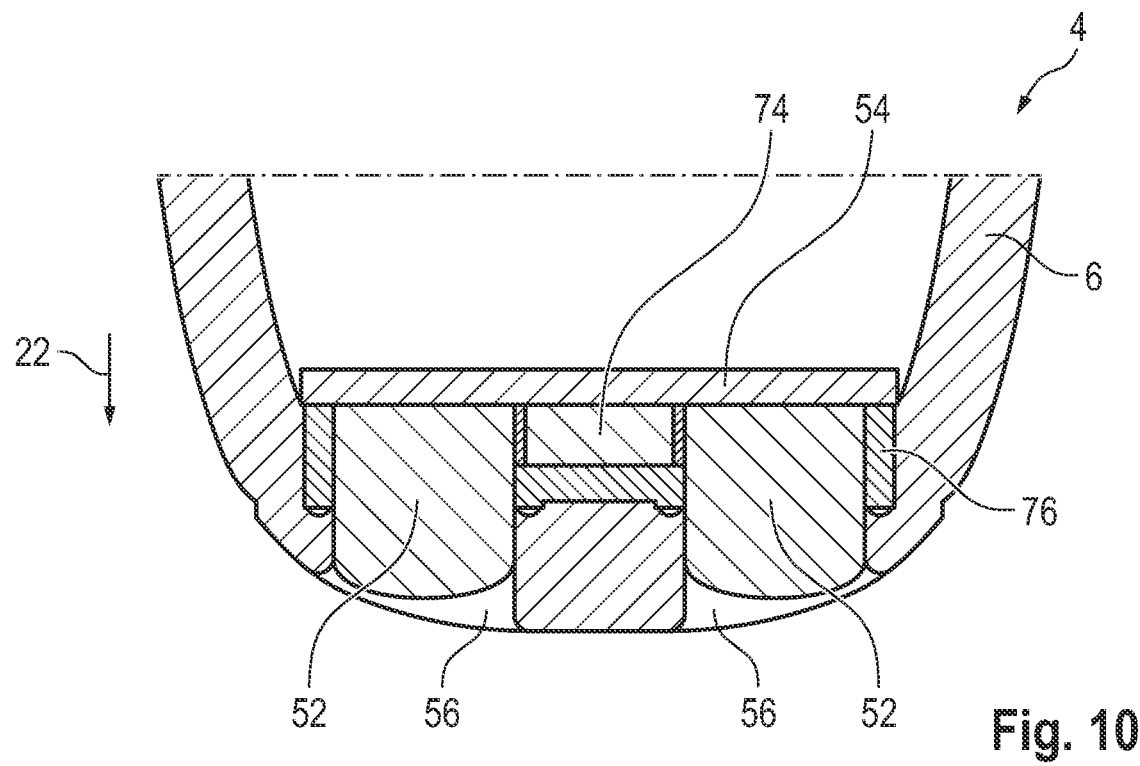
FIGS. 10 and 11 are sectional views each showing different variants of the hearing aid.

FIG. 10 shows a modification of the hearing aid 4 in detail in a sectional illustration. A Hall sensor 74 is fastened on the further printed circuit board 54 on the lower side in the longitudinal direction 22, thus on the side facing toward the charging unit 14. By means of this sensor, the approach of the hearing aid 4 to the magnet 38 is detected. When the measurement data acquired by means of the Hall sensor 74 exceed a certain value, it is ensured that the counter contacts 52 have fallen below a specific distance to the magnet 38, at which the counter contacts 52 directly mechanically abut the contacts 36 due to the design conditions. The counter contacts 52 are also still arranged in the pocket holes 56, the bottom of which is provided in each case by means of the further printed circuit board 54. The counter contacts 52 are solely placed on the further printed circuit board 54 in this variant, without protruding through the further printed circuit board 54.

Moreover, a further seal 76 is fastened on the further printed circuit board 54, which is located on the side of the Hall sensor 74 and encloses it. The further seal 76 also encloses the counter contacts 52 and is used to seal the interior of the hearing aid housing 6. In other words, the pocket holes 56 are lined at the ends by means of the further seal 76, so that penetration of foreign particles into the hearing aid housing 6 is avoided.

In one refinement, the structure of the hearing aid 4 is further simplified. The further printed circuit board 54 is a part of a main electronics unit here, and the magnetic and electrical counter contacts 52 are applied directly using SMD, either by a hole positioning or flatly without indentation with a positioning aid in the process. The further seal 76 can be in one piece or can also, as shown, consist of two rings and seals off the housing 6 of the hearing aid 4.

In a further modification, the Hall sensor 74 is not provided, and another electronics unit of the hearing aid 4 is arranged at this point, for example, so that the hearing aid 4 is comparatively compact. The Hall sensor 74, if it is provided, can moreover fulfill certain control tasks for the hearing aid 4 and is preferably arranged comparatively close to the magnet 38.

Figure 11:
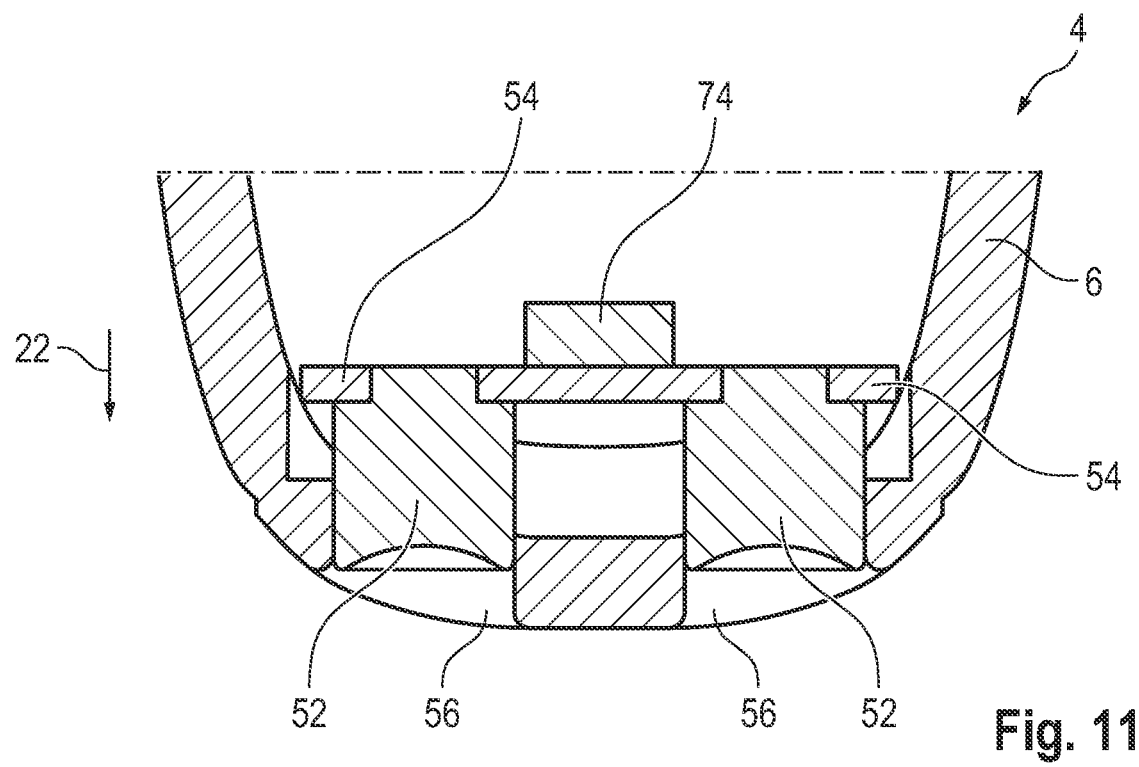

A modification of the hearing aid 4 is shown in detail corresponding to the preceding figure in FIG. 11. The further seal 76 is also provided, but not shown, and is again used to seal off the interior of the hearing aid housing 6. For this purpose, the further seal 76 also encloses the two counter contacts 52 and partially lines the pocket holes 56. The further seal 76 is also furthermore fastened on the further printed circuit board 54.

The two counter contacts 52 again protrude through the further printed circuit board 54, as also in the variant shown in FIG. 5. The Hall sensor 74 is arranged on the side opposite to the openings of the pocket holes 56, thus on the upper side of the further printed circuit board 54 in the longitudinal direction 22, when the hearing aid 4 is held inside the receptacle 20.

The refinements mentioned with respect to FIG. 10 can also be used in the variant shown in FIG. 11.

Figure 12:
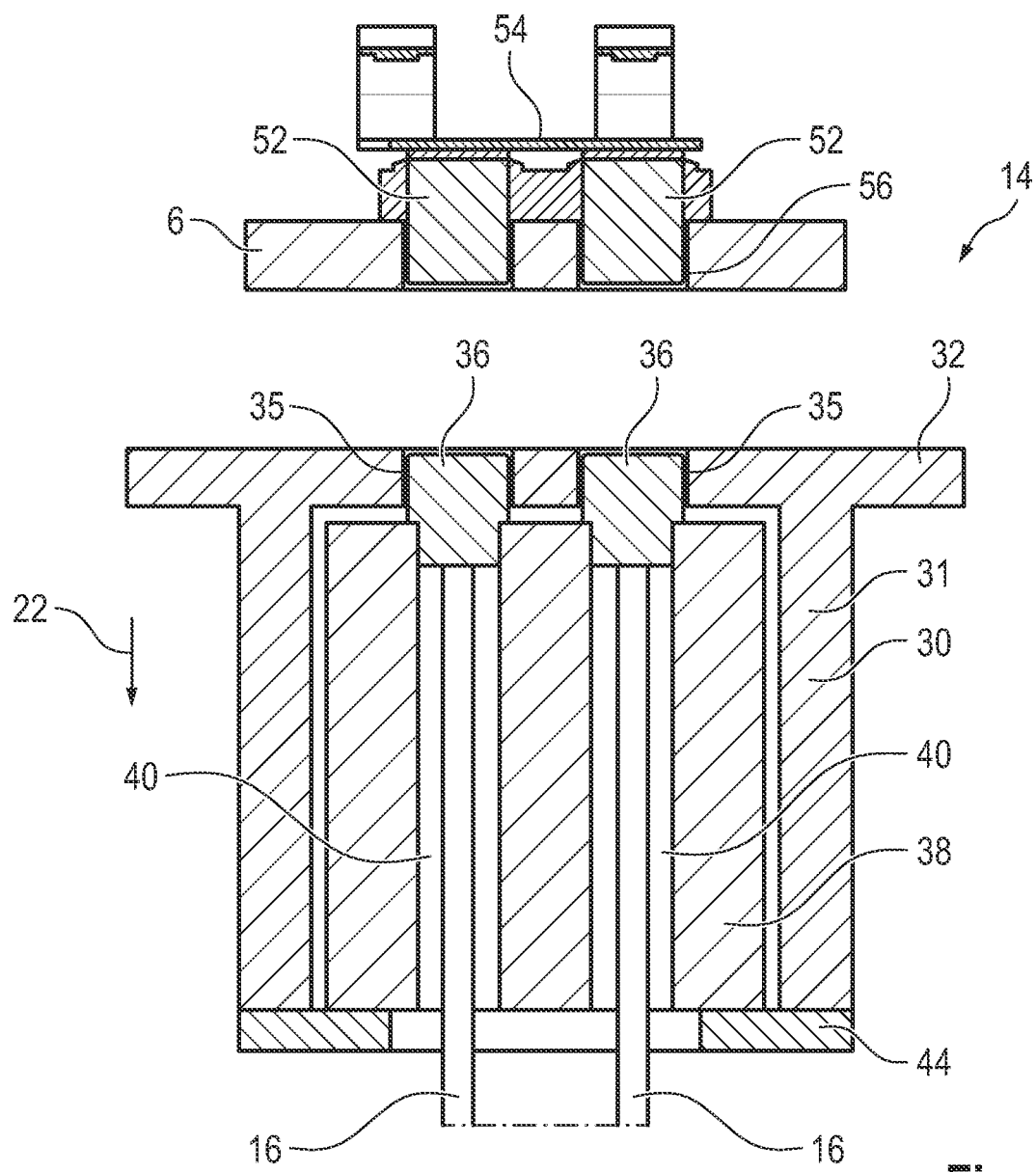
FIGS. 12 and 13 are sectional views each showing a further variant of the hearing aid and the charging unit.
Figure 13:
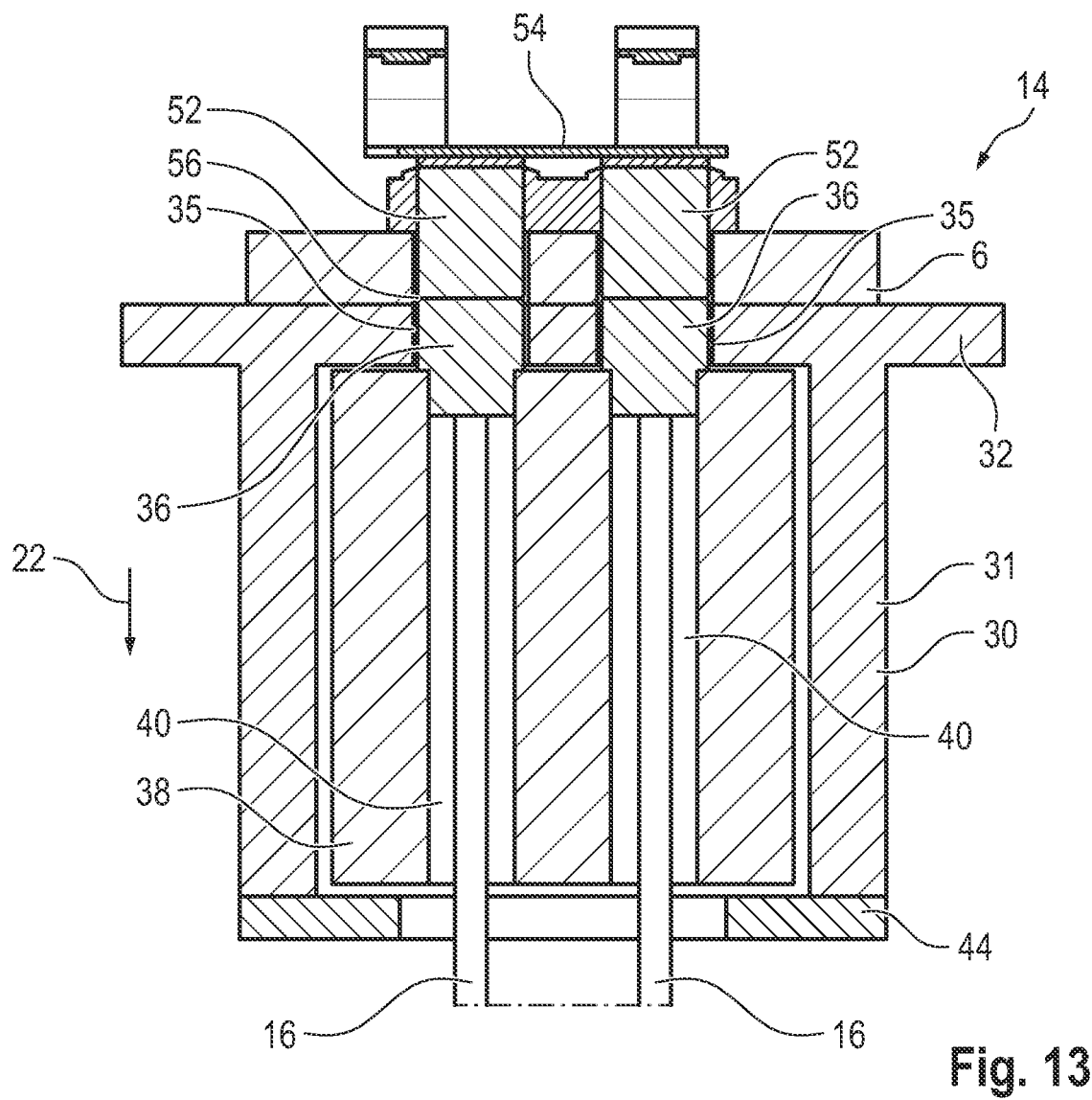

A last modification of the charging unit 14 is shown in a sectional illustration along the longitudinal direction 22 in FIG. 12 and FIG. 13. In this embodiment, all components of the housing 30 are manufactured from a rigid plastic. The housing 30 also again has the remainder 31, on which, however, the housing cover 32 is molded and is integral therewith. As a modification, the stop 44, which is also still formed by means of a rigid ring, and which forms the lower end of the housing 30 in the longitudinal direction 22, is a separate component. In the assembled state, the stop 44 is fastened on the further components of the remainder 31, for example, by means of welding or adhesive bonding. When the stop 44 is not yet assembled, the magnet 38, which is designed according to the variant shown in FIGS. 3-5, is introduced in the housing 30 from this side. The magnet 38 thus again has the two recesses 40 extending in the longitudinal direction 22.

The lines 16 also correspond to the variant shown in FIGS. 3-5. The contacts 36 are again arranged in the openings 35, and with the exception of the ends opposite to the magnet 38, are manufactured in accordance with the preceding embodiment. However, these ends are made flat and smooth in contrast to the preceding embodiment. A clearance fit is also formed between the contacts 36 and the respective recess 35, so that the contacts 36 can be moved in the longitudinal direction 22 through the housing cover 32 by means of the magnet 38.

The counter contacts 52 are offset inward with respect to the surface of the hearing aid housing 6, so that the counter contacts 52 do not protrude beyond the surface of the hearing aid housing 6. When the counter contacts 52, which are also formed flat at the ends and are also again fastened on the further printed circuit board 54, are moved toward the charging unit 14, the two contacts 36 are moved upward in the longitudinal direction 22 due to the magnetic interaction, as shown in FIG. 13, so that the electrical and mechanical contacting of the contacts 36 with the two counter contacts 52 again takes place. In this state, the contacts 36 protrude upward in the longitudinal direction 22 beyond the housing cover 32 and plunge at the ends into the pocket holes 56, which do not have a bottom in this embodiment.

When the hearing aid 4 is spaced apart from the charging unit 14, the magnetic interaction cannot compensate for the weight force, so that the magnet 38 is moved downward in the longitudinal direction 22, until it rests on the stop 44, as shown in FIG. 12. In this case, the contacts 36 are retracted into the openings 35, so that they do not protrude upward beyond the housing cover 32 in the longitudinal direction 22. In this state, the contacts 36 are, for example, flush with the surface of the housing cover 32 or are offset slightly further downward in the longitudinal direction 22. Damage to the contacts 36 is thus prevented. The movement of the magnet 38 and thus of the contacts 36 in the longitudinal direction 22 is limited in this embodiment by means of the rigid housing cover 32 and the rigid stop 44. In one refinement, the counter contacts 52 and/or the contacts 36 are again made curved.

In summary, preferably all pins, namely the two contacts 36 and the two counter contacts 52 of the hearing aid 4, are electrical and magnetic. The material is preferably magnetic steel. The field lines of the magnet 38 are bundled and aligned by the arrangement and shape of the pins (contacts 36/counter contacts 52). In this way, an effective magnetic force utilization results due to the high number and the constriction of the field lines between the pin pairs. The pins are magnetized by the magnet 38 and snap together due to the acting magnetic force at sufficiently small distance.

The invention is not restricted to the above-described exemplary embodiments. Rather, other variants of the invention can be derived therefrom by a person skilled in the art without leaving the subject matter of the invention. In particular, furthermore all individual features described in conjunction with the individual exemplary embodiments are also combinable with one another in other ways, without leaving the subject matter of the invention.

The following is a summary list of reference numerals and the corresponding structure used in the above description of the invention:
2 system
4 hearing aid
6 hearing aid housing
8 charging device
10 charging shell
12 charging circuit
14 charging unit
16 line
18 inlay
20 receptacle
22 longitudinal direction
24 charging opening
26 spring
28 groove
30 housing
31 remainder
32 housing cover
33 extension
34 depression
35 opening
36 contact
38 magnet
40 recess
42 step
43 longitudinal end
44 stop
46 further opening
48 slot
50 bar
52 counter contact
54 further printed circuit board
56 pocket hole
58 seal
60 first printed circuit board
62 seal ring
64 second printed circuit board
66 tab
68 holding opening
70 pin
72 assembly opening
74 Hall sensor
76 further seal

The invention claimed is:

1. A charging device for a hearing aid, the charging device comprising:
a charging circuit;
a charging unit, containing:
a housing having a housing cover;
a magnet disposed in said housing and movably guided in a longitudinal direction;
a contact attached on said magnet at one longitudinal end of said magnet, said contact being attached for a detachable, direct electrical contacting with a counter contact of the hearing aid, wherein said housing cover having an opening formed therein and in said opening said contact is inserted;
a first printed circuit board fastened on said longitudinal end of said magnet, wherein said contact is fastened on said first printed circuit board; and
a line, said contact electrically connected by means of said line to said charging circuit, wherein said line is at least partially formed by means of a flexible printed circuit board, which is fastened on said first printed circuit board; and
said charging circuit having a second printed circuit board, said housing is circumferentially enclosed by said second printed circuit board of said charging circuit, and said second printed circuit board being fastened on said housing cover.

2. The charging device according to claim 1, wherein said flexible printed circuit board is guided at a circumference of said magnet along the longitudinal direction.

3. The charging device according to claim 1, wherein said magnet has a recess formed therein and extending in the longitudinal direction through said magnet, and within said recess said line is disposed, and said recess is closed on one side by means of said contact.

4. The charging device according to claim 1, wherein said housing cover is produced from rubber.

5. The charging device according to claim 1, wherein said housing has a stop for said magnet, by means of said stop a movement of said magnet is limited.

6. The charging device according to claim 1, wherein:
said housing has a slot formed therein; and
said charging unit has a bar protruding transversely to the longitudinal direction and beyond said magnet and is attached to said magnet on a side opposite to said contact, said bar is guided in said slot of said housing and said housing extending in the longitudinal direction.

7. The charging device according to claim 1, wherein said contact has a curved end facing away from said magnet.

8. The charging device according to claim 1, wherein:
said charging unit is disposed such that the longitudinal direction is vertical; and
said contact is disposed above said magnet.

9. A system, comprising:
a hearing aid having a hearing aid housing and a counter contact disposed in said hearing aid housing; and
said charging device according to claim 1.

10. A charging device for a hearing aid, the charging device comprising:
a charging circuit;
a charging unit, containing:
a housing having a housing cover;
a magnet disposed in said housing and movably guided in a longitudinal direction;
a contact attached on said magnet at one longitudinal end of said magnet, said contact being attached for a detachable, direct electrical contacting with a counter contact of the hearing aid, wherein said housing cover having an opening formed therein and in said opening said contact is inserted; and
a line, said contact electrically connected by means of said line to said charging circuit;
an inlay having a charging opening formed therein, said charging opening being at least partially closed by means of said housing cover; and
a charging shell being lined by said inlay and said inlay being detachably fastened on said charging shell, and on said charging shell said charging unit is detachably fastened.

11. The charging device according to claim 10,
further comprising a first printed circuit board fastened on said longitudinal end of said magnet;
wherein said contact is fastened on said first printed circuit board; and
wherein said line is at least partially formed by means of a flexible printed circuit board, which is fastened on said first printed circuit board.

12. The charging device according to claim 11, wherein said charging circuit has a second printed circuit board, said housing is circumferentially enclosed by said second printed circuit board of said charging circuit, and said second printed circuit board is fastened on said housing cover.

13. The charging device according to claim 11, wherein said flexible printed circuit board is guided at a circumference of said magnet along the longitudinal direction.

14. The charging device according to claim 10, wherein said magnet has a recess formed therein and extending in the longitudinal direction through said magnet, and within said recess said line is disposed, and said recess is closed on one side by means of said contact.

15. The charging device according to claim 10, wherein said housing cover is produced from rubber.

16. The charging device according to claim 10, wherein said housing has a stop for said magnet, by means of said stop a movement of said magnet is limited.

17. The charging device according to claim 10, wherein:
said housing has a slot formed therein; and
said charging unit has a bar protruding transversely to the longitudinal direction and beyond said magnet and is attached to said magnet on a side opposite to said contact, said bar is guided in said slot of said housing and said housing extending in the longitudinal direction.

18. The charging device according to claim 10, wherein said contact has a curved end facing away from said magnet.

19. The charging device according to claim 10, wherein:
said charging unit is disposed such that the longitudinal direction is vertical; and
said contact is disposed above said magnet.

* * * * *